(No Model.)
J. W. SCHOAF.
CAR BRAKE.
No. 503,003.  Patented Aug. 8, 1893.
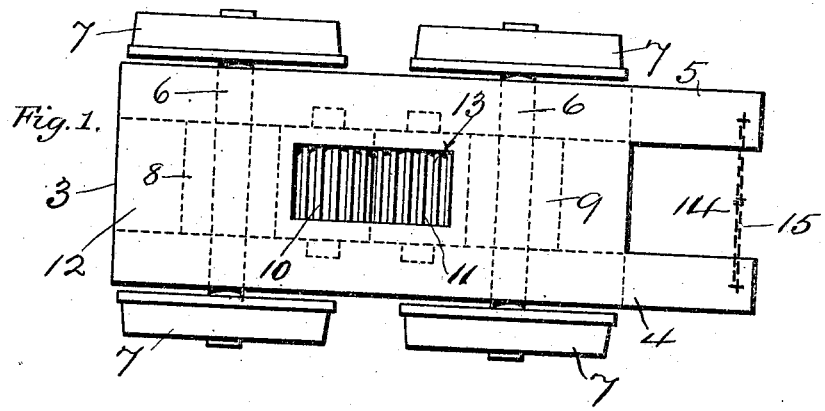
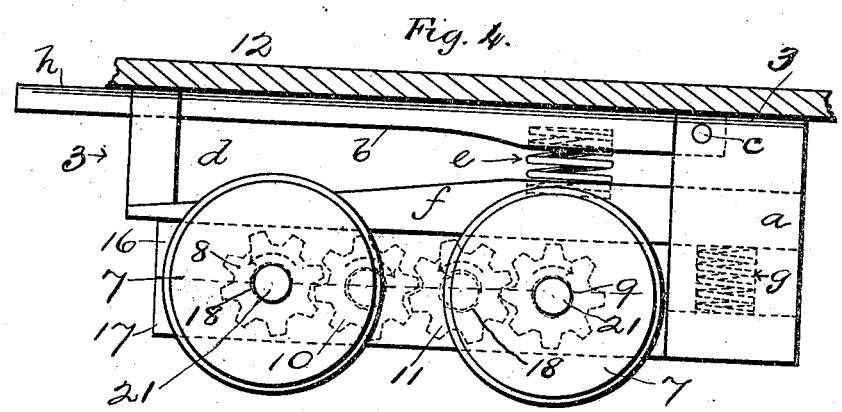
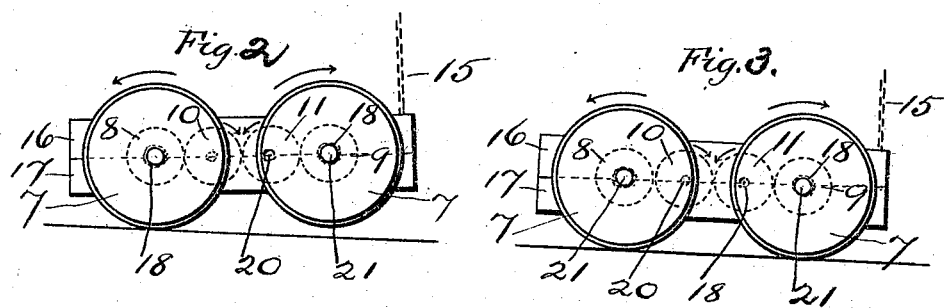
Witnesses
Elliott P. Hough.
E. R. Brown
Inventor
John W. Schoaf
By Chas. J. Gooch
Attorney

UNITED STATES PATENT OFFICE.

JOHN WILLIAM SCHOAF, OF McKEESPORT, PENNSYLVANIA.

CAR-BRAKE.

SPECIFICATION forming part of Letters Patent No. 503,003, dated August 8, 1893.

Application filed May 24, 1893. Serial No. 475,372. (No model.)

*To all whom it may concern:*

Be it known that I, JOHN WILLIAM SCHOAF, a citizen of the United States, residing at McKeesport, in the county of Allegheny and State of Pennsylvania, have invented certain new and useful Improvements in Brakes; and I do hereby declare the following to be a full, clear, and exact description of the invention, such as will enable others skilled in the art to which it appertains to make and use the same.

This invention relates to improvements, as hereinafter described, in brakes for cars and other articles where traction wheels are employed.

In the accompanying drawings,—Figure 1 represents a top plan view of my improved brake with the top platform of the truck removed. Fig. 2 represents an end view of the brake device with one end lifted to place the brake out of operation. Fig. 3 is a side elevation representing the brake in operation. Fig. 4 represents a side elevation of my brake device with a spring-arm lifting device connected therewith.

My improved brake is adapted for use in connection with cars or vehicles and running gear of every description having traction wheels.

My brake is intended to be attached to the platform, truck or body of a car, or other vehicle having traction wheels, but I desire it to be understood that it is adapted for use not only in connection with railroad, pit, street and other cars, but also in connection with vehicles generally and also in connection with running gear generally where traction wheels requiring a brake are employed.

3 represents the truck of my improved brake which is composed of two longitudinal side beams, 4, 5, in which the shafts or journals 6, carrying the brake-wheels, 7, and the cog-gearing, 8, 9, meshing with the cogs 10, 11, on said shafts or journals having bearing, and a flat horizontal top beam or platform, 12, which rests upon and is secured to the tops of said side beams so as to brace the same.

13 represents a slot or opening in the top beam or platform, 12, through which any suitable device, as a bolt, may be passed to connect the truck, 3, with the vehicle or other article to which it is applied, said connection being of sufficient looseness to permit of one end of the truck, 3, being raised from a horizontal line.

14 represents a slot or recess formed in one end of the platform 12 of the truck, 3, within which, as shown in Figs. 1, 2, and 3 may be secured a chain, rod or equivalent device, 15, by means of which that end of the truck, 3, may either be raised or lowered when it is desired to either raise and hold my brake out of operation, as shown in Fig. 2, or lower the truck into operative position, as shown in Fig. 3; said brake-raising device, 15, being connected with any suitable levers, rods, or equivalent device as will be readily understood (not shown) easy of access to and under the control of the driver whereby the end of the brake-truck can be readily raised or lowered.

In lieu of connecting a chain or rod, as 15, to the end to be raised, as shown in Figs. 1, 2 and 3 the truck, 3, may, as shown in Fig. 4, be formed with depending wings *a* within which a lever or arm *b* is pivoted at *c* and side pieces *d*, said arm or lever *b* being supported by a spring *e* having bearing at its bottom in a ledge *f* and the wings *a* having spring connection as at *g*. In this arrangement on forcing down the outer end, *h*, of the lever or arm *b*, which may be accomplished in any known way such, for instance, as by a rod under the control of the driver pressing thereon, the spring end of said truck will be raised out of tractional contact with the roadway or track, and thus release the brake from operation after the manner shown in Fig. 2; when downward pressure on the outer end of the lever or arm *b* is released the springs will return said lever and the raised end of the truck to their normal horizontal positions and place all the wheels in tractional braking operation.

The side beams 4, 5, are each formed of two longitudinal sections, 16, 17, to facilitate access to the gearing whenever desired and to admit of the ready assembling of the parts; these sections 16, 17, have semi-cylindrical, or concave recesses 19, to receive and afford bearing, respectively, for the journals, 20, of the two, central cogs 10, 11, and for the shafts or journals, 21, of the brake-wheels 7. Each shaft or journal, 21, of the brake-wheels, 7, has either cast or formed integrally therewith, or formed separate therefrom and mounted thereon, a cog-wheel, 8 or 9, which rotates with the shaft or journal 21, by which it is carried. Centrally of these cogs, 8, 9, are similar cogs, 10, 11, journaled in the side beams, 4, 5, and meshing, respectively, with the cogs, 8, 9, all of said cog gearing being located between said side beams of the truck, 3, which beams serve to prevent sidewise oscillation of said cogs. It will be readily apparent that the arc of revolution of each adjacent intermeshing pair of cogs is in the reverse direction of a circle. Consequently, when it is desired that the running gear of the vehicle or other mechanism shall travel unimpededly, the raising of the, we will say rear, end 22 of the brake-truck will raise the rear brake-wheels from traction and leave the brake wheels at the front end, 23, of the brake-truck in tractional contact with and free to revolve on the track. In this position, the front brake-wheels will freely rotate in unison with the ordinary traction wheels or running gear of the vehicle or other article with which they are connected, and all the cogs, with the suspended rear brake-wheels, will rotate as idlers.

When it is desired to apply the brake, the rear end of the brake-truck is lowered to a horizontal position to bring the rear brake wheels into traction with the track whereupon the attempted rotation of the brake-wheels will bring the reversely-rotating train of cog-gearing into opposition which results in the absolute locking of said gearing and of the brake-wheel journals and brake-wheels which latter with the brake-truck, will then slide along the track and operate as a "skid" or brake to speedily and effectually retard and stop the movement of the vehicle to which my brake is attached.

By the simple construction and arrangement of device above described, a cheap, readily-produced and operated and effective brake-mechanism capable of use in connection with vehicles and traction mechanism generally is presented which can be readily applied to existing vehicles.

Having thus described my invention, what I claim is—

1. Brake-mechanism consisting of a truck adapted to be secured to a vehicle or other moving body with capability of vertical movement at one end relatively to said vehicle, brake-wheels journaled in said truck, and a connected train of oppositely-rotating cog gearing mounted, respectively, on the journals or axles of said brake-wheels and mediately thereof, substantially as and for the purposes set forth.

2. A brake-mechanism for vehicles and the like, consisting of a truck, a bolt or equivalent device connecting said truck with the vehicle with freedom of vertical movement at one end, raising and lowering mechanism attached at one end of said truck for the purpose of raising and lowering said end, brake-wheels journaled in said truck, cogs centrally mounted upon the wheel journals and cogs journaled in the truck mediately of the wheel journals and intermeshing with the cogs on said journals and having rotary movement in a direction opposite to that of the adjacent cog, substantially as and for the purpose set forth.

3. A brake-mechanism for the purpose described, consisting of a truck composed of two side beams each formed of two longitudinal sections and having concaved journal bearings a beam-bracing top platform, brake-wheels journaled in said side beams, a train of intermeshing reversely-rotating cog gearing connecting the journals or axles of said brake-wheels, and a raising and lowering device connected with one end of said truck for the purpose of raising and lowering said end, substantially as and for the purposes set forth.

In testimony whereof I affix my signature in presence of two witnesses.

JOHN WILLIAM SCHOAF.

Witnesses:
J. L. WELSHAUS,
JOHN W. ALBIG.